(12) United States Patent
Nishida et al.

(10) Patent No.: US 11,311,977 B2
(45) Date of Patent: Apr. 26, 2022

(54) MACHINE TOOL

(71) Applicant: Yamazaki Mazak Corporation, Niwa-gun (JP)

(72) Inventors: Kiyoshi Nishida, Niwa-gun (JP); Takahiro Kugimoto, Niwa-gun (JP); Masanori Shimaoka, Niwa-gun (JP); Mikio Wakida, Niwa-gun (JP); Takuya Mizuno, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 16/785,652

(22) Filed: Feb. 10, 2020

(65) Prior Publication Data

US 2020/0230759 A1    Jul. 23, 2020

Related U.S. Application Data

(63) Continuation of application No. PCT/JP2017/029171, filed on Aug. 10, 2017.

(51) Int. Cl.
*B23Q 3/157* (2006.01)
*B23Q 11/08* (2006.01)
*B23Q 3/155* (2006.01)

(52) U.S. Cl.
CPC ..... *B23Q 3/15526* (2013.01); *B23Q 3/15539* (2016.11); *B23Q 3/15713* (2013.01);
(Continued)

(58) Field of Classification Search
CPC ........... Y10T 483/175; Y10T 483/1855; Y10T 483/1845; Y10T 483/1776; Y10T 483/176;
(Continued)

(56) References Cited

U.S. PATENT DOCUMENTS 2,318,081 A * 5/1943 Kerry .................. B25H 3/04
211/70.6
3,273,235 A * 9/1966 Dziedzic ............ B23Q 3/15773
483/48
(Continued)

FOREIGN PATENT DOCUMENTS

CN    101811264    8/2010
CN    201863037 U    6/2011
(Continued)

OTHER PUBLICATIONS

Machine Translation of DE 102015121254 A1, which DE '254 was published Jun. 2016.*
(Continued)

*Primary Examiner* — Erica E Cadugan
(74) *Attorney, Agent, or Firm* — Mori & Ward, LLP

(57) ABSTRACT

A machine tool includes a tool spindle, a tool intermediate device, and a tool storage which includes first tool magazines, a first tool magazine support mechanism, an additional first tool magazine support mechanism, and a tool carrier. The first tool magazine support mechanism includes a first shaft to support at least one of the first tool magazines to be rotatable about a first rotation axis. The additional first tool magazine support mechanism includes an additional first shaft to support at least one of the first tool magazines to be rotatable about an additional first rotation axis. The tool carrier includes a first guide extending along the first and additional first rotation axes, a second guide extending along a line connecting the first and additional first rotation axes, and a lift configured to move along the first guide. The first guide is movable along the second guide.

7 Claims, 6 Drawing Sheets

(52) U.S. Cl.
CPC ...... *B23Q 3/15722* (2016.11); *B23Q 3/15706* (2013.01); *B23Q 3/15773* (2013.01); *B23Q 11/08* (2013.01); *B23Q 2003/15532* (2016.11); *B23Q 2003/155407* (2016.11); *B23Q 2003/155411* (2016.11); *B23Q 2003/155418* (2016.11); *Y10T 483/115* (2015.01); *Y10T 483/175* (2015.01); *Y10T 483/1776* (2015.01); *Y10T 483/1779* (2015.01); *Y10T 483/1788* (2015.01); *Y10T 483/1855* (2015.01); *Y10T 483/1882* (2015.01)

(58) Field of Classification Search
CPC ......... Y10T 483/1757; Y10T 483/1717; Y10T 483/1873; Y10T 483/1882; B23Q 3/15539; B23Q 2003/155407; B23Q 2003/155411; B23Q 3/15773; B23Q 2003/155446; B23Q 3/15526; B23Q 3/15722
USPC .......... 483/37, 64, 63, 48, 41, 40, 23, 66–67
See application file for complete search history.

(56) References Cited

U.S. PATENT DOCUMENTS

| | | | |
|---|---|---|---|
| 3,546,774 A | 12/1970 | Stoferle et al. | |
| 4,920,632 A * | 5/1990 | Babel | B23Q 3/15539 483/64 |
| 5,304,110 A | 4/1994 | Obrist | |
| 7,635,327 B1 | 12/2009 | Liao | |
| 9,022,236 B1 * | 5/2015 | Amendolea | A47F 5/02 211/144 |
| 2002/0043138 A1 | 4/2002 | Kato | |

FOREIGN PATENT DOCUMENTS

| | | | |
|---|---|---|---|
| CN | 204413705 U | | 6/2015 |
| CN | 204471058 U | | 7/2015 |
| CN | 205325300 U | | 6/2016 |
| CN | 106975957 | | 7/2017 |
| DE | 4015460 A1 | * | 11/1991 |
| DE | 19510498 A1 | * | 9/1996 |
| DE | 102014104786 | | 10/2015 |
| DE | 102015121254 A1 | * | 6/2016 |
| EP | 1190811 | | 3/2002 |
| EP | 1375059 | | 1/2004 |
| FR | 2115764 | | 7/1972 |
| JP | 49-011380 U | | 1/1974 |
| JP | 60-039039 | | 2/1985 |
| JP | 62-102938 A | * | 5/1987 |
| JP | 62-199333 A | * | 9/1987 |
| JP | 01-257541 | | 10/1989 |
| JP | 05-185343 | | 7/1993 |
| JP | 05-078443 U | | 10/1993 |
| JP | 06-000741 | | 1/1994 |
| JP | 06-114666 | | 4/1994 |
| JP | 08-187640 | | 7/1996 |

OTHER PUBLICATIONS

Machine Translation of JP 62-102938 A, which JP '938 was published May 1987.*
Machine Translation of DE 19510498 A1, which DE '498 was published Sep. 1996.*
Machine Translation of JP 62-199333 A, which JP '333 was published Sep. 1987.*
Chinese Office Action for corresponding CN Application No. 201780088979.4, dated Feb. 25, 2020.
European Search Report for corresponding EP Application No. 17920674.3-1016, dated Mar. 2, 2020.
European Office Action for corresponding EP Application No. 17920674.3-1016, dated Mar. 18, 2020.
International Search Report for corresponding International Application No. PCT/JP2017/029171, dated Oct. 3, 2017.
Written Opinion for corresponding International Application No. PCT/JP2017/029171, dated Oct. 3, 2017.
Japanese Office Action for corresponding JP Application No. 2017-561424, dated Feb. 15, 2019 (w/ English machine translation).

* cited by examiner

MACHINE TOOL

CROSS-REFERENCE TO RELATED APPLICATIONS

The present application is a continuation application of International Application No. PCT/JP2017/029171, filed Aug. 10, 2017. The contents of this application are incorporated herein by reference in their entirety.

BACKGROUND OF THE INVENTION

Field of the Invention

The present invention relates to a machine tool.

Discussion of the Background

For example, in machine tools such as machining centers, different kinds of tools are used for different kinds of machining. This necessitates exchange of a tool mounted on a tool spindle for another tool every time a different kind of machining is performed. For further example, a machine tool may be caused to perform continuous machining for a long period of time by automatic operation. In this case, if the tool is damaged during machining, it is necessary to exchange the tool with a new tool.

Machine tools (combined multi-functional machine tools) are equipped with a configuration to perform automatic tool exchange. An example of such configuration includes: a tool magazine that stores a plurality of kinds of tools; and an automatic tool changer (ATC) that includes transfer mechanism to transfer a tool stored in the tool magazine with the spindle. An example of a machine tool that uses such automatic tool changer is disclosed in JP 6-741A, for example. In the configuration disclosed in JP 6-741A, one reference tool magazine selected from among N tool magazines is connected to the machine tool, and the rest of the tool magazines is connected to the reference tool magazine through a tool carrier. JP 1-257541A discloses a machine tool that includes: an endless chain located in the machine tool and including a plurality of tools receivers; tool storages located outside the machine tool and made up of a plurality of endless chains; and a guide shoe that receives and transfers a tool between the endless chain and the tool storage.

SUMMARY OF THE INVENTION

According to one aspect of the present invention, a machine tool includes a tool spindle, a tool intermediate device, and a tool storage. A tool is attachable to the tool spindle. The tool intermediate device is configured to carry the tool to and from the tool spindle. The tool storage includes first tool magazines, a first tool magazine support mechanism, an additional first tool magazine support mechanism, and a tool carrier. Each of the first tool magazines includes first grippers. Each of the first grippers is configured to grip the tool. The first tool magazine support mechanism includes a first shaft to support at least one of the first tool magazines to be rotatable about a first rotation axis of the first shaft. The additional first tool magazine support mechanism includes an additional first shaft to support at least one of the first tool magazines to be rotatable about an additional first rotation axis of the additional first shaft. The tool carrier is configured to carry the tool between the tool intermediate device and the first tool magazines. The tool carrier includes a first guide extending along the first rotation axis and the additional first rotation axis, a second guide extending along a line connecting the first rotation axis and the additional first rotation axis, and a lift configured to move along the first guide. The first guide is movable along the second guide.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
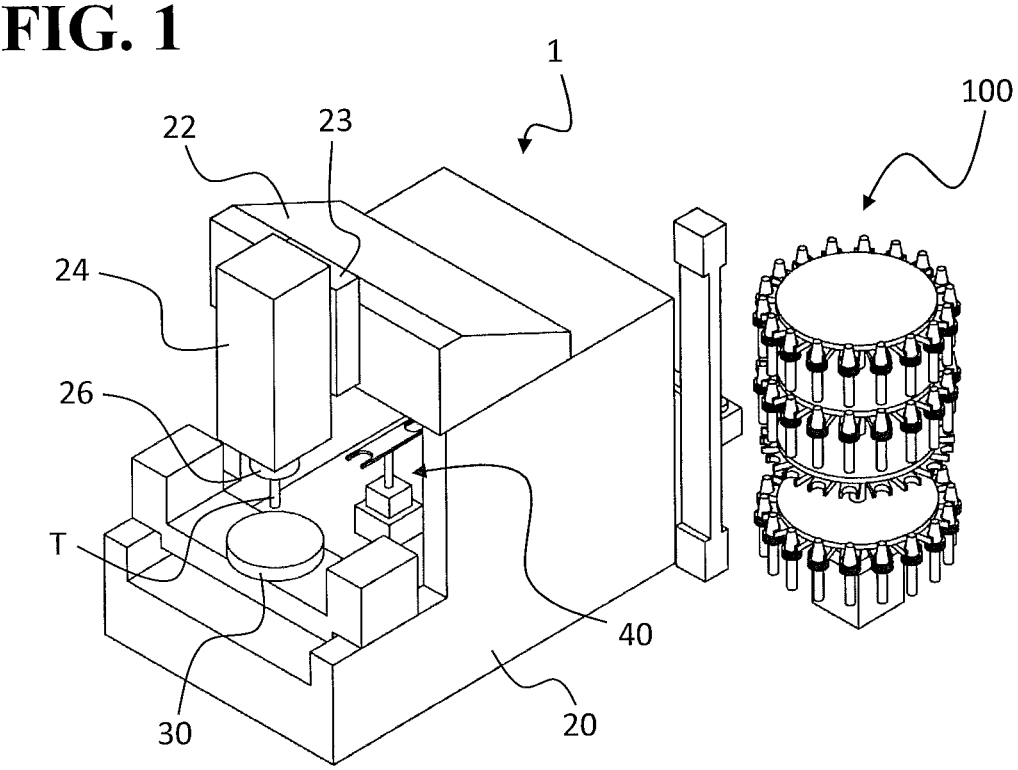
FIG. 1 is a schematic perspective view of a front side of a machine tool according to embodiment 1 of the present invention.

Machine tools according to the embodiments of the present invention will be described in detail below by referring to the drawings.

Embodiment 1

Figure 2:
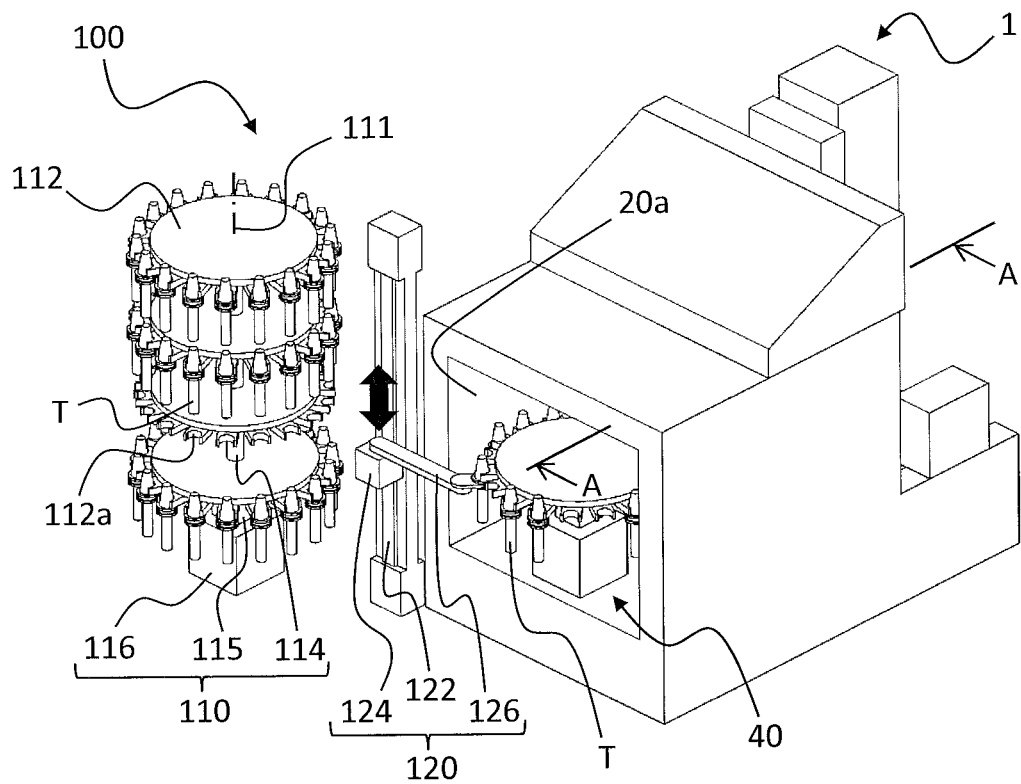
FIG. 2 is a schematic perspective view of a rear side of the machine tool according to embodiment 1 of the present invention.
Figure 3:
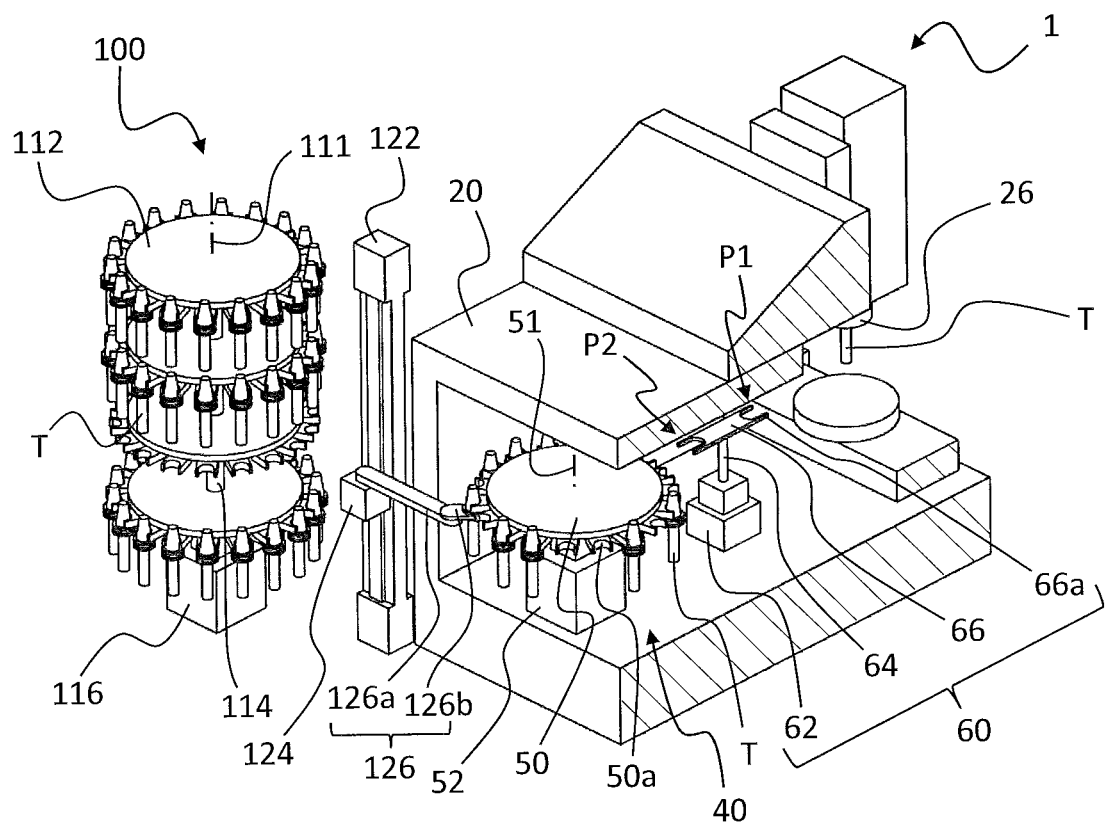
FIG. 3 is a schematic perspective view of the machine tool in a cross-section cut along A-A illustrated in FIG. 2.
Figure 4:
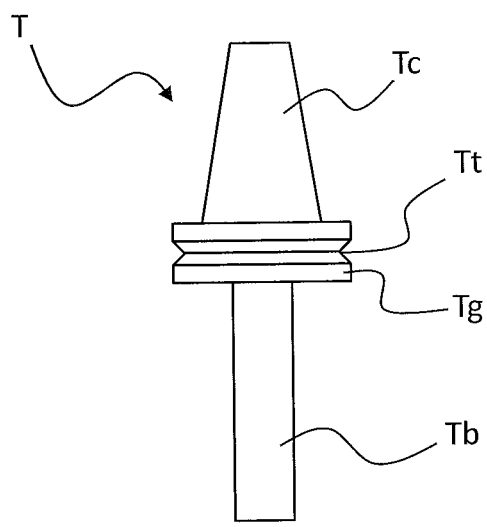
FIG. 4 is a side view of a representative tool applicable to machine tools according to the embodiments of the present invention.

FIG. 1 is a schematic perspective view of the front side of a machine tool according to embodiment 1 of the present invention. FIG. 2 is a schematic perspective view of the rear side of the machine tool according to embodiment 1 of the present invention. FIG. 3 is a schematic perspective view of the machine tool in a cross-section cut along A-A illustrated in FIG. 2. FIG. 4 is a side view of a representative tool applicable to machine tools according to the embodiments of the present invention.

As illustrated in FIGS. 1 and 2, a machine tool 1 according to embodiment 1 of the present invention includes: a tool spindle 26, to which a tool T is attached; a tool intermediate device 40, which carries the tool T to and from the tool spindle 26 to exchange the tool T between the tool spindle 26 and the tool intermediate device 40; and a tool storage 100, which exchanges the tool T between the tool intermediate device 40 and the tool storage 100. As illustrated in FIG. 4, the tool T, which is applicable to the machine tool 1 according to embodiment 1 of the present invention, includes, for example: a cutting tool Tb; a gripped part Tg, which receives the cutting tool Tb detachably at one end of the gripped part Tg; and a chuck Tc, which has a taper shape integral to the other end of the gripped part Tg. The gripped part Tg has an approximately cylindrical shape with a gripped groove Tt formed on the outer surface of the gripped part Tg and extending in a circumferential direction of the gripped part Tg.

As illustrated in FIGS. 1 and 2, an example of the machine tool 1 according to embodiment 1 of the present invention is a 5-axis machining center. The tool spindle 26 is mounted on a tool headstock 24 such that the tool T is rotatable. The tool headstock 24 is mounted on a base 20 through a saddle 23 and a column 22 such that the tool headstock 24 is movable relative to the base 20. The base 20 has an approximate box shape. One side of the box shape is an open space in which a table 30 is mounted, and the opposite side defines an opening 20a. On the surface of the table 30 facing the tool spindle 26, a clamper to hold a workpiece, a bolt to fasten a workpiece, or a similar tool is located (neither of which is illustrated). The table 30 may be rotatable about an axis approximately parallel to, for example, the rotation axis of the tool spindle 26. Alternatively, the table 30 may be rotatable about an approximately horizontal axis.

As illustrated in FIG. 2, the tool storage 100 is located outside the base 20. The tool storage 100 includes: first tool magazines 112, each capable of storing a plurality of tools T; and a tool magazine support mechanism 110, which supports a first tool magazine stack in which at least one first tool magazine 112 is stacked. The tool storage 100 may further include a tool carrier 120, which exchanges the tool T between the tool intermediate device 40 and the tool storage 100.

Each first tool magazine 112 is rotatable about a first rotation axis 111 and includes a plurality of first grippers 112a on or near the outer circumference of the first tool magazine 112. Each of the first grippers 112a is capable of gripping the tool T at the chuck Tc, for example. The tool magazine support mechanism 110 includes: a support member (a first shaft) 114, which supports the first tool magazine 112; a drive mechanism 115, which makes the first tool magazine 112 rotate about the first rotation axis 111 of the first shaft 114; and a support platform 116, which supports the support member 114 and the drive mechanism 115. The tool magazine support mechanism 110 has such a supporting configuration that the first tool magazines 112 are stacked on top of one another along the first rotation axis 111. The drive mechanism 115 performs an indexing operation by rotating the first tool magazine 112 so as to position the tool T gripped in a first gripper 112a at a predetermined position (for example, transfer position P3, described later by referring to FIG. 5A). In this manner, the tool storage 100 stores the tool Tin the first gripper 112a of the first tool magazine 112. In the tool storage 100 according to embodiment 1 of the present invention, the drive mechanism 115 is used to rotate the support member 114, thereby rotating the first tool magazine 112. It is also possible to provide the support member 114 at a position displaced from the first rotation axis 111 so that the drive mechanism 115 may directly rotate the first tool magazine 112. The first tool magazine 112 is able to freely set which portion of the tool T to grip, and the shape of the first gripper 112a is determined based on the portion to be gripped. It is to be noted that while each first tool magazine 112 according to embodiment 1 of the present invention includes 18 first grippers 112a, the number of first grippers 112a to be arranged on the first tool magazine 112 will not be limited to 18. It is also possible for each of the plurality of first tool magazines 112 to include a different number of first grippers 112a.

As illustrated in FIG. 2, the tool carrier 120 according to embodiment 1 of the present invention includes: a first guide 122, which extends in the direction in which the first tool magazines 112 are stacked on top of one another; and a lift 124, which is movable along the first guide 122. The number of first tool magazines 112 to be stacked may be changed. In light of this, the first guide 122 may be provided in advance a length great enough to deal with the change, or the first guide 122 may be exchanged by another first guide 122 that has a length adapted to an increase or decrease of first tool magazines 112. It is to be noted that the mechanism to move the lift 124 along the first guide 122 may be a drive mechanism using a belt, a drive mechanism using a ball screw, or a drive mechanism using a rack and pinion.

As illustrated in FIGS. 2 and 3, the tool carrier 120 further includes a gripping atm 126, which is mounted on an upper portion of the lift 124. The gripping arm 126 includes, for example, a first gripping arm 126a and a second gripping arm 126b. One end of the first gripping arm 126a is turnably mounted on the upper portion of the lift 124, and the other end of the first gripping alto 126a is turnably connected to one end the second gripping arm 126b. At the other end of the second gripping arm 126b, a tool gripper (not illustrated) to hold, for example, the gripped part Tg of the tool T is located. The gripping arm 126 may be partially exchanged by some other element located at the tool intermediate device 40 or the tool carrier 120 so that the element makes a movement corresponding to, for example, the turning movement implemented by the first gripping arm 126a and the second gripping arm 126b.

As illustrated in FIG. 3, the tool intermediate device 40 is partially located in the base 20. The tool intermediate device 40 includes, for example, a second tool magazine 50, which temporarily holds a plurality of tools T. The tool intermediate device 40 may further include: a second tool magazine support mechanism 52, which supports the second tool magazine 50 and makes the second tool magazine 50 rotate relative to the base 20; a tool exchange mechanism 60, which exchanges a tool T between the second tool magazine 50 and the tool spindle 26.

The second tool magazine 50 is rotatable about a second rotation axis 51 and includes a plurality of second grippers 50a on or near the outer circumference of the second tool magazine 50. Each of the plurality of second grippers 50a is capable of gripping the tool T at the chuck Tc, for example. The second tool magazine support mechanism 52 is located at a position in the base 20 opposed to the table 30 across the tool exchange mechanism 60. The second tool magazine support mechanism 52 includes a motor (not illustrated) that provides rotational force to the second tool magazine 50. The plurality of second grippers 50a, which are located on the second tool magazine 50, are partially outside the base 20 through the opening 20a. The second tool magazine 50 performs an indexing operation by rotating itself so as to index a second gripper 50a at a predetermined position (for example, transfer position P4, described later by referring to FIG. 5C). It is to be noted that while the second tool magazine 50 according to embodiment 1 of the present invention includes 18 second grippers 50a, the number of second grippers 50a to be arranged on the second tool magazine 50 will not be limited to 18.

The tool exchange mechanism 60 includes: a tool exchange arm support 62; a rotatable shaft 64; a tool exchange arm 66, which is mounted on the rotatable shaft 64; and a movement mechanism (not illustrated) to move between the second tool magazine 50 and the tool spindle 26. The tool exchange arm 66 is, for example, an approximately rectangular planar member and has grippers 66a, described later, at both ends in the longitudinal direction of the tool exchange arm 66. The grippers 66a grip the gripped part Tg of the tool T. The tool exchange arm support 62 includes therein a movement mechanism (not illustrated) to cause the tool exchange arm 66 to move the grippers 66a in vertical directions. The tool exchange arm 66 is mounted on the rotatable shaft 64 at the center of gravity of the tool exchange arm 66. The tool exchange atm support 62 includes therein a motor (not illustrated) to make the rotatable shaft 64 rotate about the axial direction of the rotatable shaft 64. With this configuration, the rotatable shaft 64 and the tool exchange arm 66 rotate, for example, on a 180-° basis so that the tool T is indexed to transfer position P1, which is on the tool spindle 26 side, and to transfer position P2, which is on the second tool magazine 50 side.

With the foregoing configurations, when the tool T held at the second tool magazine 50 of the tool intermediate device 40 has been positioned to face the transfer position P2 of the tool exchange arm 66, a gripper 66a of the tool exchange arm 66 grips the tool T. Then, the tool exchange arm 66 rotates by 180°, causing the tool T gripped in the gripper 66a to be indexed to the transfer position P1. Then, the tool exchange mechanism 60 and the tool spindle 26 move to a predetermined tool exchange position, where the tool T is mounted on the tool spindle 26.

Figure 5A:
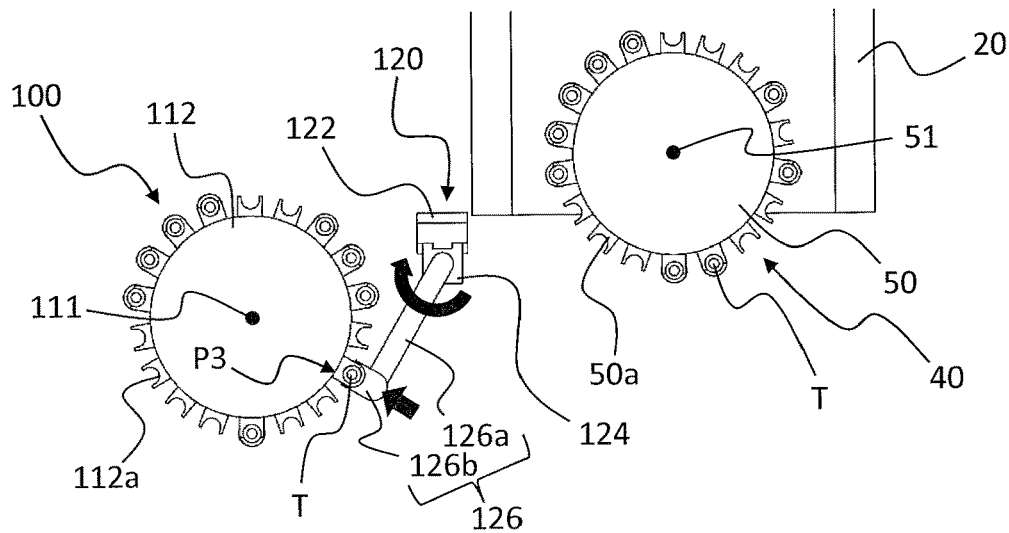
FIG. 5A is a top view of part of a tool storage and a tool intermediate device of the machine tool according to embodiment 1 of the present invention in a first stage of an exemplary operation of exchanging the tool between the tool storage and the tool intermediate device.
Figure 5B:
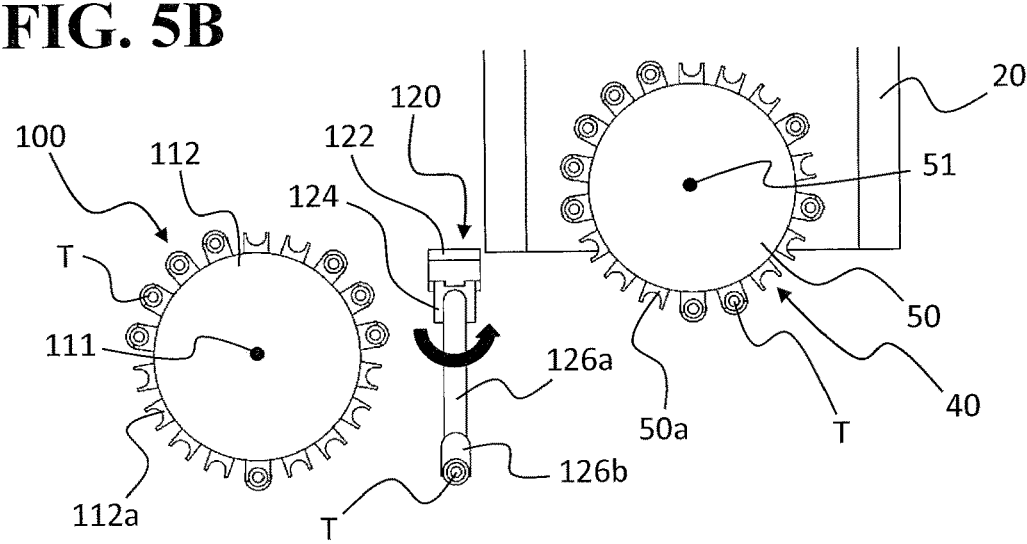
FIG. 5B is a top view of part of the tool storage and the tool intermediate device of the machine tool according to embodiment 1 of the present invention in a second stage of the exemplary operation of exchanging the tool between the tool storage and the tool intermediate device.
Figure 5C:
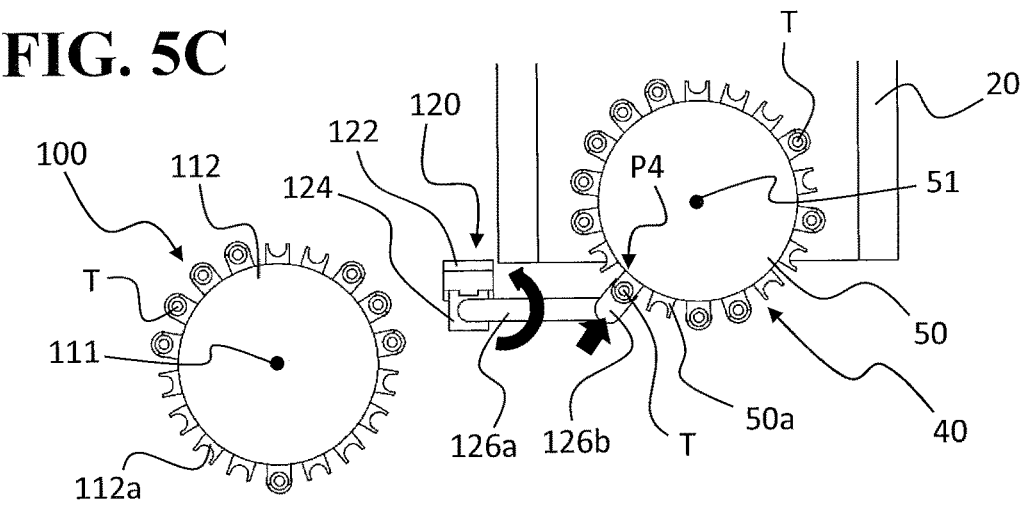
FIG. 5C is a top view of part of the tool storage and the tool intermediate device in a third stage of the exemplary operation of exchanging the tool between the tool storage and the tool intermediate device.

FIGS. 5A to 5C are top views of part of the tool storage 100 and the tool intermediate device 40 of the machine tool 1 according to embodiment 1 of the present invention, illustrating an exemplary operation of exchanging the tool T between the tool storage 100 and the tool intermediate device 40. FIG. 5A illustrates a first stage, FIG. 5B illustrates a second stage, and FIG. 5C illustrates a third stage of the operation. FIGS. 5A to 5C illustrate a flow of movements to transfer the tool T from the first tool magazine 112 of the tool storage 100 to the second tool magazine 50 of the tool intermediate device 40. The tool T can also be transferred from the second tool magazine 50 to the first tool magazine 112 by making reverse movements, proceeding from FIG. 5C to FIG. 5A.

In the machine tool 1 according to embodiment 1 of the present invention, a tool T is moved from the tool storage 100 to the tool intermediate device 40 using the tool carrier 120. First, as illustrated in FIG. 5A, the first tool magazine 112 of the tool storage 100 rotates to position a desired tool T at the transfer position P3. Then, the first gripping arm 126a and the second gripping arm 126b turn to make the tool gripper of the second gripping arm 126b grip the gripped part Tg of the tool T (first stage). As necessary, the lift 124 may be moved along the first guide 122 to adjust the height of the gripping arm 126 to the height of the first tool magazine 112.

Next, with the tool gripper of the second gripping arm 126b gripping the tool T, the first gripping arm 126a turns to move the tool T toward the second tool magazine 50, which is located in the base 20 (second stage). As necessary, the lift 124 may be moved along the first guide 122 to adjust the height of the second gripping arm 126b to the height of the second tool magazine 50.

Next, the first gripping arm 126a and the second gripping arm 126b further turn to move the tool T gripped in the tool gripper of the second gripping arm 126b to a second gripper 50a of the second tool magazine 50 located at the transfer position P4. Then, the second gripper 50a grips the tool T at the chuck Tc. Thus, the operation of transferring the tool T is complete (third stage). Then, the second tool magazine 50 rotates to move the tool T at the second tool magazine 50 to the transfer position P2, which is on the side of the tool exchange mechanism 60 illustrated in FIG. 3. Then, the tool T is mounted onto the tool spindle 26 by the tool exchange mechanism 60.

In the machine tool 1 according to embodiment 1 of the present invention, the tool storage 100 includes: the first tool magazines 112, each storing a plurality of tools T; and the tool magazine support mechanism 110, which supports a first tool magazine stack in which at least one first tool magazine 112 is stacked. Thus, the tool storage 100 has a multi-level structure in which a plurality of first tool magazines 112, each gripping a plurality of tools T, are stacked on top of one another. This configuration ensures that a need for changing the tool capacity of the machine tool 1 can be dealt with by increasing or decreasing the number of first tool magazines 112 stacked on the tool magazine support mechanism 110. As a result, changing of the tool capacity has no or minimal influence on a projected area of a top view of the tool storage 100, that is, the occupation area of the machine tool. In other words, the machine tool according to embodiment 1 of the present invention deals with a need for changing the tool capacity by increasing or decreasing the occupation area of the machine tool as a whole by a minimal degree, as compared with conventional machine tools. Even though the occupation area of the machine tool is increased or decreased, it is not necessary to relocate the machine tool itself or make a layout change in a factory as a whole. This facilitates changing of the tool capacity of the machine tool. Additionally, in changing the tool capacity, it is not necessary to design and produce a machine tool itself and/or a cover or a similar element for the machine tool. Further, existing parts common to the tool magazines can be used to make another tool magazine, resulting in a reduction in production step count and production cost.

Also in the machine tool 1 according to embodiment 1 of the present invention, the tool storage 100 further includes the tool carrier 120, which carries the tool T between the tool intermediate device 40 and the tool storage 100. The tool carrier 120 includes: the first guide 122, which extends in the direction in which the first tool magazines 112 are stacked on top of one another; and the lift 124, which is movable along the first guide 122. This configuration ensures that an increase or decrease in the first tool magazines 112 is dealt with by adjusting the height of the lift 124 of the tool carrier 120 to the height of the first tool magazine 112 holding the tool T. This configuration, in turn, facilitates movement control and movement adjustment associated with changing of the tool capacity. Additionally, no matter which level of first tool magazine 112 is storing the tool T, the time spent taking out the tool T does not vary greatly. This configuration prevents a great increase in the tool exchange time, as compared with conventional machine tools.

The tool carrier 120 further includes the gripping arm 126, which is turnable to move the tool T between the tool intermediate device 40 and the tool carrier 120. With this simple turning movement, the tool T can be exchanged, facilitating movement control and movement adjustment associated with changing of the tool capacity. Also, the simple movement enables the tool to be exchanged rapidly.

The first tool magazine 112 indexes the tool T to a predetermined position, and the gripping arm 126 of the tool carrier 120 grips the tool T indexed to the predetermined position. This configuration ensures that only a single position in plan view needs to be set as the transfer position P3 of the tool storage 100. This configuration, in turn, facilitates movement control and movement adjustment associated with changing of the tool capacity.

Also in the machine tool 1 according to embodiment 1 of the present invention, the tool intermediate device 40 includes the second tool magazine 50, which is capable of storing a plurality of tools T. This configuration enables the tool intermediate device 40 to temporarily store a plurality of tools T. This configuration, in turn, ensures that a plurality of tools T that are stored in the tool storage 100 and that are to be used in the next and later steps can be moved in advance to the tool intermediate device 40. As a result, the tool exchange time is kept uniform no matter how many first tool magazines 112 are used and no matter which first tool magazine 112 is storing a desired tool T.

Figure 6A:
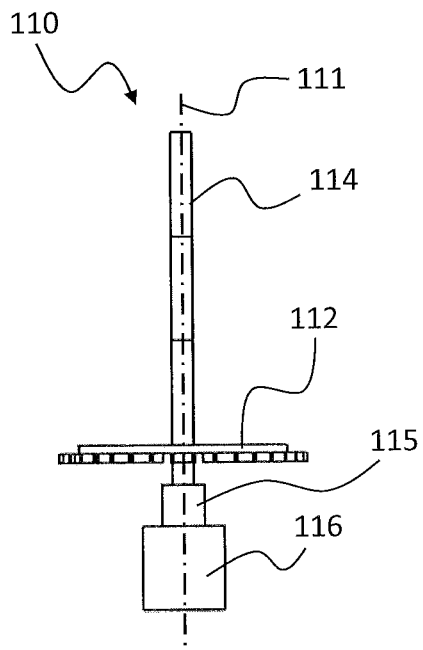
FIG. 6A is a schematic side view of a tool magazine support mechanism and a first tool magazine of a machine tool according to a first modification of embodiment 1 of the present invention where there is one level of first tool magazine.
Figure 6B:
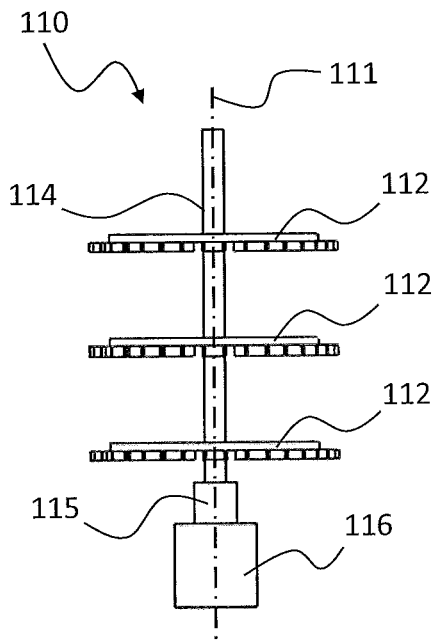
FIG. 6B is a schematic side view of the tool magazine support mechanism and the first tool magazine of the machine tool according to the first modification of embodiment 1 of the present invention where there are three levels of first tool magazines.

FIGS. 6A and 6B are schematic side views of a tool magazine support mechanism of a machine tool according to a first modification of embodiment 1 of the present invention. FIG. 6A illustrates a case where there is one level of first tool magazine 112, and FIG. 6B illustrates a case where there are three levels of first tool magazines 112. FIGS. 1 to 3 illustrate a four-level structure in which four first tool magazines 112 are stacked on top of one another along the support member 114 of the tool magazine support mechanism 110. In the tool magazine support mechanism 110 according to this modification, a single first tool magazine 112 may be mounted on the support member 114, as illustrated in FIG. 6A, for example. It is also possible to employ a multi-level structure in which any other number of first tool magazines 112 are stacked on top of one another in the direction in which the support member 114 extends (that is, along the first rotation axis 111), such as a three-level structure as illustrated in FIG. 6B, in which three first tool magazines 112 are mounted on the support member 114. Alternatively, the tool storage 100 may have another kind of multi-level structure such that the first tool magazine 112, the support member 114, and the support platform 116 form every level (this combination will be referred to as "unit") and that a plurality of units are stacked on top of one another. This configuration ensures that each unit can be controlled individually.

Figure 7:
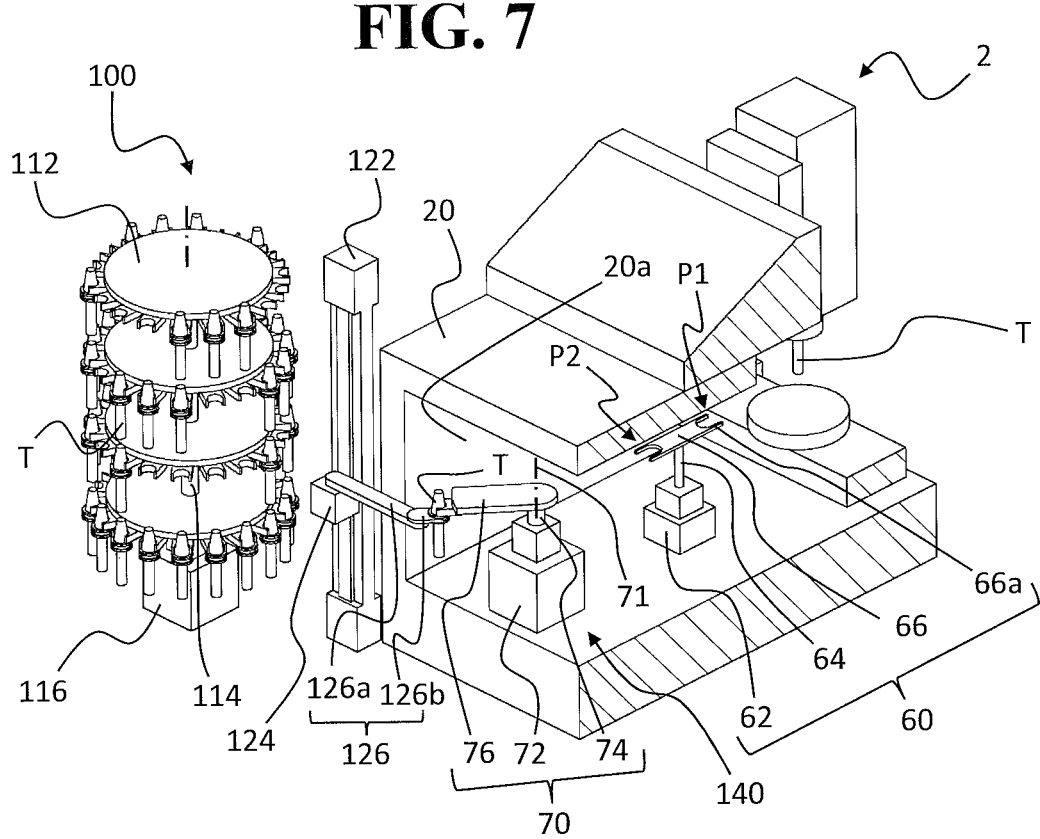
FIG. 7 is a schematic perspective view of a rear side, partially in cross-section, of a machine tool according to a second modification of embodiment 1 of the present invention.

FIG. 7 is a schematic perspective view of the rear side, partially in cross-section, of a machine tool 2 according to a second modification of embodiment 1 of the present invention. The cross-section of the machine tool 2 illustrated in FIG. 7 is obtained by cutting along the A-A cross-section line on the machine tool 1 illustrated in FIG. 2, As illustrated in FIG. 7, a tool intermediate device 140 according to the second modification includes an armed tool intermediate mechanism 70, instead of the second tool magazine 50, which temporarily holds a plurality of tools T. The armed tool intermediate mechanism 70 transfers a tool T between the gripping arm 126 of the tool carrier 120 and the tool exchange arm 66 of a tool exchanger 60. The armed tool intermediate mechanism 70 includes: an intermediate arm support mechanism 72; an arm support member 74, which is located on the intermediate arm support mechanism 72; and an arm member 76, which is mounted on one end of the arm support member 74. The intermediate arm support mechanism 72 includes therein a support platform (not illustrated) that provides rotational force to the arm support member 74 to rotate about a third rotation axis 71. At one end, the arm member 76 is mounted on the arm support member 74. At the other end, the arm member 76 includes a gripper (not illustrated) to grip the tool T at the chuck Tc, for example. The arm member 76 is turnable together with rotation of the arm support member 74. The other end of the arm member 76, at which the gripper is mounted, is located outside the base 20 through the opening 20a when the other end of the arm member 76 is at the position where the tool is transferred between the gripping arm 126 of the tool carrier 120 and the other end of the arm member 76.

Embodiment 2

Figure 8:
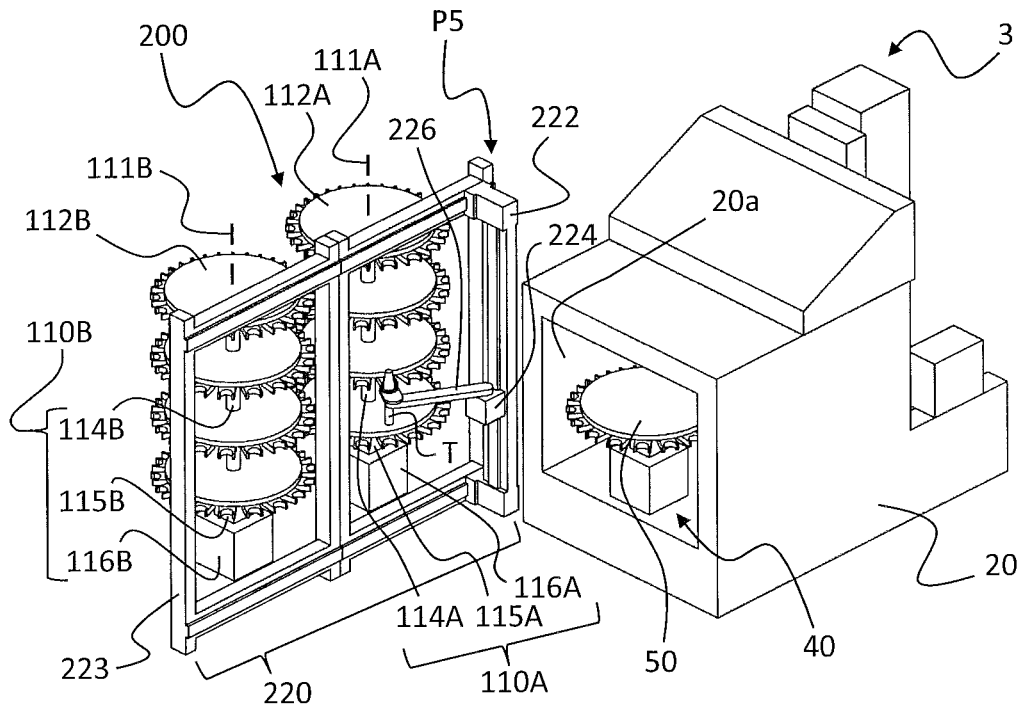
FIG. 8 is a schematic perspective view of a rear side of a machine tool according to embodiment 2 of the present invention.
Figure 9A:
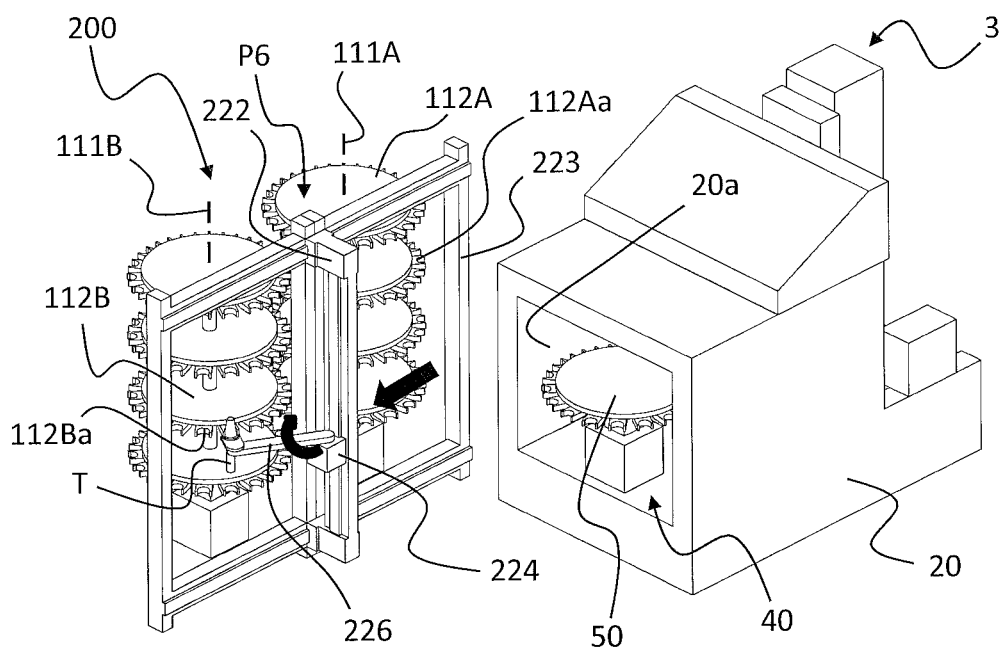
FIG. 9A is a perspective view of a tool storage and a tool intermediate device of the machine tool according to embodiment 2 of the present invention in a first stage of an exemplary operation of exchanging the tool between the tool storage and the tool intermediate device.
Figure 9B:
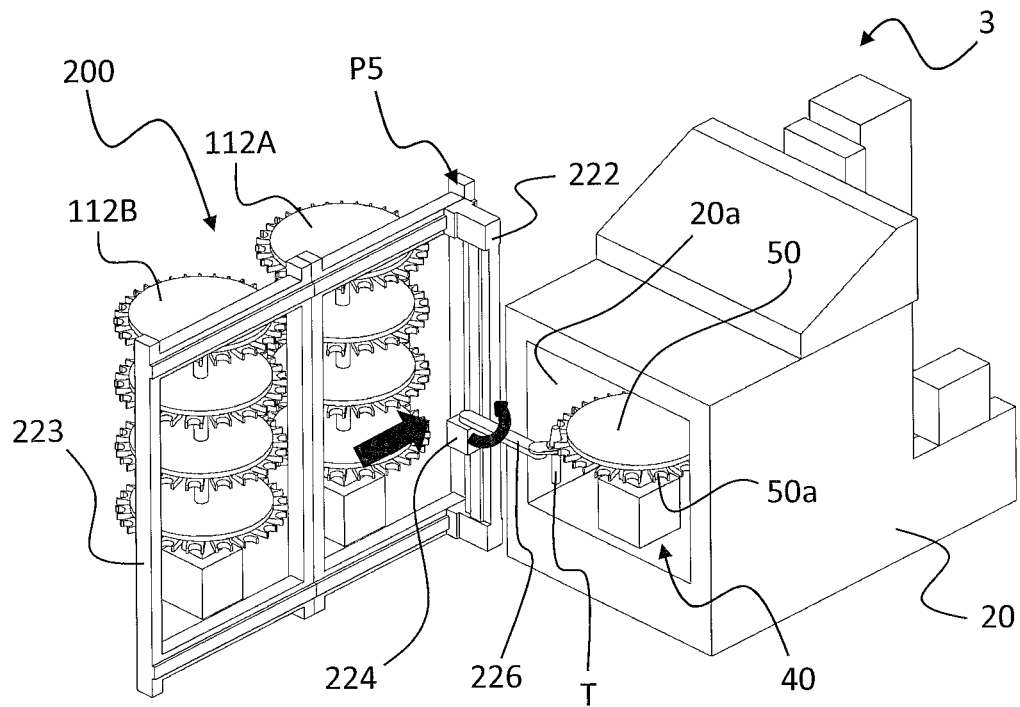
FIG. 9B is a perspective view of the tool storage and the tool intermediate device of the machine tool according to embodiment 2 of the present invention in a second stage of the exemplary operation of exchanging the tool between the tool storage and the tool intermediate device.

FIG. 8 is a schematic perspective view of the rear side of a machine tool according to embodiment 2 of the present invention. FIGS. 9A and 9B are perspective views of part of the tool storage and the tool intermediate device of the machine tool according to embodiment 2 of the present invention, illustrating an exemplary operation of exchanging a tool between the tool storage and the tool intermediate device. FIG. 9A illustrates a first stage and FIG. 9B illustrates a second stage of the operation. Where an element illustrated in FIG. 8 and/or FIG. 9 has the same structure and/or functions as a corresponding element of the machine tool according to embodiment 1, these elements are denoted using identical reference numerals, and redundant description will be omitted.

As illustrated in FIG. 8, a machine tool 3 according to embodiment 2 of the present invention includes a tool storage 200, which exchanges the tool T between the tool intermediate device 40 and the tool storage 200. The tool storage 200 according to embodiment 2 includes: first tool magazines 112A, each capable of storing a plurality of tools T; a first tool magazine support mechanism 110A, which supports a first tool magazine stack in which at least one first tool magazine 112A is stacked; first tool magazines 112B, each capable of storing a plurality of tools T, similarly to the first tool magazines 112A; a second tool magazine support mechanism (an additional first tool magazine support mechanism) 110B, which is located adjacent to the first tool magazine support mechanism 110A and supports a second tool magazine stack in which at least one first tool magazine 112B is stacked; and a tool carrier 220, which transfers a tool T between the first tool magazines 112A and the second tool magazine 50 of the tool intermediate device 40 and between the first tool magazines 112B and the second tool magazine 50. In other words, in the tool storage 200 according to embodiment 2, the tool magazine support mechanisms (110A, 110B) are arranged next to each other. It is to be noted that while in FIG. 8 two tool magazine support mechanisms are provided, it is also possible, as necessary, to provide three or more tool magazine support mechanisms arranged in series and to extend a second guide 223, described later, of the tool carrier 220.

The tool magazine support mechanism 110A includes a support member (a first shaft) 114A which supports the first tool magazines 112A; and a drive mechanism 115A, which make the first tool magazines 112A rotate about a first rotation axis 111A of the first shaft 114A. The additional tool magazine support mechanism 110B includes a support member (an additional first shaft) 114B which supports the first tool magazines 112B; and a drive mechanism 115B, which make the first tool magazines 112B rotate about an additional first rotation axis 111B of the additional first shaft 114B. The tool magazine support mechanisms (110A, 110B) include support platforms (116A, 116B), which respectively support the support members (114A, 114B) and the drive mechanisms (115A, 115B). The tool magazine support mechanisms (110A, 110B) have such a supporting configuration that the first tool magazines (112A, 112B) are stacked on top of one another along the first rotation axes (111A, 111B). The first tool magazines (112A, 112B) respectively include a plurality of first grippers (112Aa, 112Ba) on or near the outer circumferences of the first tool magazines (112A, 112B). Each of the first grippers (112Aa, 112Ba) is capable of gripping the tool T at the chuck Tc, for example, so that tools T are stored in the first tool magazines (112A, 112B) by being gripped in the first grippers (112Aa, 112Ba).

The tool carrier 220 includes a first guide 222, which extends in the direction in which the tool magazine support mechanisms (110A, 110B) are stacked on top of one another. Namely, the first guide 222 extends along the first rotation axis 111A and the additional first rotation axis 111B. The tool carrier 220 further includes the second guide 223, which extends in the direction in which the tool magazine support mechanisms (110A, 110B) are aligned with each other. Namely, the second guide 223 extends along a line connecting the first rotation axis 111A and the additional first rotation axis 111B. The tool carrier 220 further includes a lift 224, which is movable along the first guide 222; and a gripping arm 226, which is mounted on an upper portion of the lift 224. The gripping arm 226 has the same configuration as the gripping arm 126 according to embodiment 1. The first guide 222, at its upper end and lower end, is on the second guide 223 and thus is movable in the direction in which the tool magazine support mechanisms (110A, 110B) are aligned with each other. The position of the first guide 222 along the second guide 223 illustrated in FIG. 8 will be referred to as initial position P5. It is to be noted that the mechanism to move the first guide 222 along the second guide 223 may be a drive mechanism using a belt, a drive mechanism using a ball screw, or a drive mechanism using a rack and pinion.

Next, by referring to FIGS. 9A and 9B, description will be made with regard to an operation of moving the tool T between the tool storage 200 and the tool intermediate device 40 of the machine tool 3 according to embodiment 2 of the present invention. FIGS. 9A and 9B illustrate a flow of movements to transfer the tool T from a first tool magazine 112A or a first tool magazine 112B of the tool storage 200 to the second tool magazine 50 of the tool intermediate device 40. The tool T can also be transferred from the second tool magazine 50 to a first tool magazine 112A or a first tool magazine 112B by making reverse movements, proceeding from FIG. 9B to FIG. 9A.

For example, assume that a tool T stored in a first tool magazine 112B of the tool storage 200 is to be taken out and moved. First, as illustrated in FIG. 9A, the first guide 222 moves along the second guide 223 to take-out position P6, where the tool T is transferred from the first tool magazine 112B to the gripping arm 226. At the take-out position P6, the gripping arm 226 turns to grip the gripped part Tg of the tool T using the tool gripper mounted on one end of the gripping arm 226 (first stage). As necessary, the lift 224 may be moved along the first guide 222 to adjust the height of the gripping arm 226 to the height of the first tool magazine 112B.

Next, with the tool gripper of the gripping arm 226 gripping the tool T, the first guide 222 moves along the second guide 223 to the initial position P5. Next, the gripping arm 226 turns to move the tool T gripped in the tool gripper of the gripping arm 226 to the second gripper 50a of the second tool magazine 50. Then, the second gripper 50a grips the chuck Tc of the tool T. Thus, the operation of transferring the tool T is complete (second stage). As necessary, the lift 224 may be moved along the first guide 222 to adjust the height of the gripping arm 226 to the height of the second tool magazine 50. Then, similarly to embodiment 1, the second tool magazine 50 rotates to move the tool T at the second tool magazine 50 to the transfer position P2, which is on the side of the tool exchange mechanism 60 illustrated in FIG. 3. Then, the tool T is mounted onto the tool spindle 26 by the tool exchange mechanism 60.

With this configuration, the machine tool 3 according to embodiment 2 of the present invention provides additional effects, as well as providing the effects obtained in embodiment 1. Specifically, providing the additional tool magazine support mechanism, 110B, enables the tool storage 200 to store a large number of tools T enough to deal with an increase in the kinds of tools T or the number of tools T caused by an increase in the kinds of machining. Also in the machine tool 3, there is an installation space secured in advance for the second tool magazine support mechanism 110B or another additional tool magazine support mechanism. This configuration provides greater flexibility in dealing with changes such as an increase or decrease in the tool capacity. Further in the machine tool 3, the tool magazine support mechanism 110A and the tool magazine support mechanism 110B can be controlled independently of each other. This configuration ensures that while the tool magazine support mechanism 110A is operating to transfer a tool T to the tool intermediate device 40, the tool magazine support mechanism 110B can undergo arrangement work without discontinuing machining or tool exchanging. An example of the arrangement work is to provide a new tool T to a first tool magazine 112B supported by the tool magazine support mechanism 110B. This configuration eliminates or minimizes an increase in the time that the machine tool spends in machining.

Embodiment 3

Figure 10:
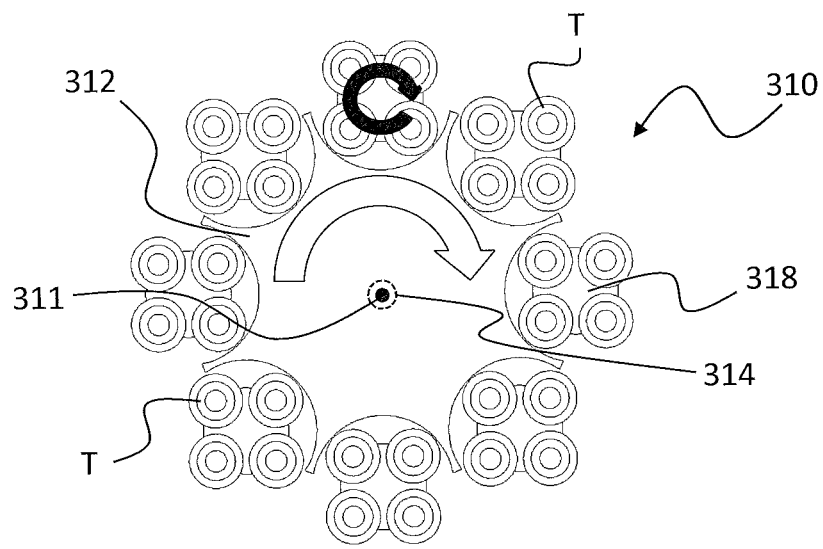
FIG. 10 is a schematic top view of a tool magazine support mechanism applicable to a machine tool according to embodiment 3 of the present invention.

FIG. 10 is a schematic top view of a tool magazine support mechanism applicable to a machine tool according to embodiment 3 of the present invention. The machine tool according to embodiment 3 employs a tool magazine support mechanism 310 illustrated in FIG. 10, instead of the tool magazine support mechanism 110 illustrated in, for example, FIGS. 2 and 3. The machine tool according to embodiment 3 is otherwise similar in configuration to embodiment 1, and redundant description will be omitted.

As illustrated in FIG. 10, the tool magazine support mechanism 310 of the machine tool according to embodiment 3 of the present invention includes: a first tool magazine 312, which is located at a center portion of the tool magazine support mechanism 310; a support member 314, which supports the first tool magazine 312 rotatably about a fourth rotation axis 311; a plurality of gripping members 318, which are located on or near the outer circumference of the first tool magazine 312, which are rotatable relative to the first tool magazine 312 about rotation axes approximately parallel to the fourth rotation axis 311, and which are capable of gripping a plurality of tools T; and a drive mechanism (not illustrated) that makes the support member 314 rotate about the longitudinal direction of the support member 314. The tool magazine support mechanism 310 has a multi-level structure in which combinations of the first tool magazine 312 and the plurality of gripping members 318 are stacked on top of one another along the fourth rotation axis 311. Also as illustrated in FIG. 10, each gripping member 318 includes, for example, a plurality of grippers (not illustrated) that are located at four positions and that are capable of gripping tools T at the chuck Tc, for example, so that each gripper stores a tool T by gripping the tool T. Each gripping member 318 includes therein a support platform (not illustrated) that makes the gripping member 318 rotate relative to the first tool magazine 312. It is to be noted that while the first tool magazine 312 according to embodiment 3 of the present invention includes eight gripping members 318, the number of gripping members 318 to be arranged in the first tool magazine 312 will not be limited to eight. It is also to be noted that while each gripping member 318 includes grippers located at four positions, the number of grippers to be provided in each gripping member 318 will not be limited to four.

With this configuration, the machine tool 3 according to embodiment 3 of the present invention provides additional effects, as well as providing the effects obtained in embodiment 1. Specifically, the machine tool 3 according to embodiment 3 includes the first tool magazine 312 and the plurality of gripping members 318, which are located on or near the outer circumference of the first tool magazine 312 and are rotatable relative to the first tool magazine 312. This configuration increases the number of tools T that can be held on one level, as compared with the first tool magazine 112 according to embodiment 1. As a result, a larger number of tools T can be stored in the tool magazine support mechanism 310 per occupation area. Additionally, each gripping member 318 is capable of holding a plurality of tools T, and the plurality of tools T can be indexed to their transfer position P3 by a movement as simple as rotation of the gripping member 318. Thus, the movement of the tool carrier is minimized without changing the structure of the tool carrier. As a result, the time that the machine tool spends in machining is minimized.

In embodiment 2, the tool magazine support mechanism 110A and the tool magazine support mechanism 110B are arranged in series, and the second guide 223 extends in the direction of the series arrangement. It is also possible to provide a carrier mechanism that carries a plurality of tool magazine support mechanisms so that the carrier mechanism moves one of the plurality of tool magazine support mechanisms so as to position a tool T to the transfer position P3, where the tool T is transferred by the gripping arm of the tool carrier.

While the machine tools according to the embodiments of the present invention have been described as 5-axis machining centers, the machine tools according to the embodiments of the present invention may be any other machine tools insofar as a tool storage is provided. Other examples include vertical machining centers, horizontal machining centers, and multifunctional machining lathes.

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool comprising:
   a base;
   a tool spindle mounted on the base and to which a tool is attachable;
   a tool intermediate device configured to carry the tool to and from the tool spindle; and
   a tool storage comprising:
   first tool magazines each of which includes first grippers, each of the first grippers being configured to grip the tool;
   a first tool magazine support mechanism including a first shaft to support one first tool magazine of the first tool magazines and another first tool magazine of the first tool magazines to be rotatable about a first rotation axis of the first shaft, the one first tool magazine and the another first tool magazine being detachably stacked on the first shaft;
   an additional first tool magazine support mechanism including an additional first shaft to support an additional first tool magazine of the first tool magazines to be rotatable about an additional first rotation axis of the additional first shaft; and
   a tool carrier configured to carry the tool from the first tool magazines to the tool intermediate device and from the tool intermediate device to the first tool magazines, the tool carrier comprising:
   a first guide extending along the first rotation axis and the additional first rotation axis;
   a second guide extending parallel to a line connecting the first rotation axis and the additional first rotation axis, the first guide being movable along the second guide; and
   a lift configured to move along the first guide,
   wherein the tool intermediate device comprises a second tool magazine which includes a plurality of second grippers configured to grip the tool,
   wherein the second tool magazine and the one first tool magazine are provided on opposite lateral sides of the second guide with respect to a longitudinal axis of the second guide;
   wherein the base defines a compartment, and wherein the second magazine is provided in the compartment such that a portion of the second magazine protrudes from the compartment.

2. The machine tool according to claim 1, wherein the tool carrier comprises a gripping arm configured to grip the tool and to move the tool to and from the tool intermediate device.

3. The machine tool according to claim 2,
   wherein the first tool magazines are configured to index the tool to respective predetermined positions, and wherein the gripping arm of the tool carrier is configured to grip the tool indexed to the respective predetermined positions.

4. The machine tool according to claim 2, wherein the second tool magazine is rotatable about a second rotation axis of the second tool magazine.

5. The machine tool according to claim 3, wherein the second tool magazine is rotatable about a second rotation axis of the second tool magazine.

6. The machine tool according to claim 1, wherein the second tool magazine is rotatable about a second rotation axis of the second tool magazine.

7. The machine tool according to claim 1, wherein the first tool magazine support mechanism and the additional first tool magazine support mechanism are provided so that the first rotation axis and the additional first rotation axis are substantially parallel.

\* \* \* \* \*